(12) United States Patent
Zlatkov et al.

(10) Patent No.: US 11,590,999 B2
(45) Date of Patent: Feb. 28, 2023

(54) HEATABLE TOUCH SENSOR AND STEERING WHEEL HAVING SUCH A TOUCH SENSOR

(71) Applicant: Volkswagen Aktiengesellschaft, Wolfsburg (DE)

(72) Inventors: Branislav Zlatkov, Braunschweig (DE); Zoran Djinovic, Wr. Neustadt (AT); Nils Quander, Koenigslutter (DE); Markus Danschacher, Braunschweig (DE); Klaus Utech, Lehre (DE); Patrick Nickel, Lauta (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 691 days.

(21) Appl. No.: 16/428,009

(22) Filed: May 31, 2019

(65) Prior Publication Data
US 2019/0367069 A1 Dec. 5, 2019

(30) Foreign Application Priority Data

May 31, 2018 (DE) ...................... 10 2018 113 061.9
May 31, 2018 (DE) ...................... 10 2018 113 062.7

(51) Int. Cl.
*B62D 1/06* (2006.01)
*B62D 1/04* (2006.01)
*G06F 3/042* (2006.01)

(52) U.S. Cl.
CPC ............... *B62D 1/06* (2013.01); *B62D 1/046* (2013.01); *G06F 3/0421* (2013.01)

(58) Field of Classification Search
CPC ........... B62D 1/06; B62D 1/065; B62D 1/046
See application file for complete search history.

(56) References Cited

U.S. PATENT DOCUMENTS

| 5,944,865 A | | 8/1999 | Do et al. | |
| 6,114,949 A | * | 9/2000 | Schmitz ............... | B60R 16/027 250/227.11 |

(Continued)

FOREIGN PATENT DOCUMENTS

| DE | 2556786 A1 | 7/1976 |
| DE | 19717607 A1 | 11/1997 |

(Continued)

OTHER PUBLICATIONS

"Interferometry," Wikipedia Page, dated by Wayback Machine to Nov. 17, 2017, url:<https://web.archive.org/web/20171117044503/https://en.wikipedia.org/wiki/Interferometry>.*

(Continued)

*Primary Examiner* — Brian J McGovern
(74) *Attorney, Agent, or Firm* — Muncy, Geissler, Olds & Lowe, P.C.

(57) ABSTRACT

The invention relates to a heatable touch sensor and a steering wheel. It has an optical waveguide which is connected to an electrical heat conductor. The optical waveguide changes its transmission behavior, which is determined, with a change in position or bending. The heat conductor is a resistance heater which emits heat by applying an electrical voltage and by the associated current flow. The touch sensor operates by means of optical interferometry, which enables a very high sensing accuracy.

13 Claims, 5 Drawing Sheets

(56) References Cited

U.S. PATENT DOCUMENTS

| | | | |
|---|---|---|---|
| 6,318,061 | B1 | 11/2001 | Schneider et al. |
| 6,365,875 | B1* | 4/2002 | Kreuzer .................. B62D 1/06 |
| | | | 219/204 |
| 6,727,467 | B1* | 4/2004 | Hadzizukic ........... B62D 1/065 |
| | | | 74/552 |
| 7,321,311 | B2 | 1/2008 | Rieth et al. |
| 10,001,614 | B2* | 6/2018 | Gao ..................... G02B 6/4486 |
| 10,254,493 | B2 | 4/2019 | Bredl et al. |
| 2005/0067397 | A1* | 3/2005 | Hilmer .................... H05B 3/34 |
| | | | 219/204 |
| 2007/0110376 | A1 | 5/2007 | Buthe et al. |
| 2008/0031578 | A1* | 2/2008 | Varkey ................. G02B 6/4404 |
| | | | 385/100 |
| 2008/0273852 | A1* | 11/2008 | Parker .................. E21B 47/113 |
| | | | 385/128 |
| 2010/0114271 | A1* | 5/2010 | Sommer ................. A61N 1/05 |
| | | | 174/11 OR |
| 2010/0116510 | A1* | 5/2010 | Varkey ................. E21B 47/135 |
| | | | 166/385 |
| 2011/0056930 | A1* | 3/2011 | Letzas ..................... H05B 3/34 |
| | | | 219/546 |
| 2013/0062329 | A1* | 3/2013 | Morita .................... H05B 3/34 |
| | | | 219/204 |
| 2015/0049995 | A1* | 2/2015 | Chen ................... G02B 6/4416 |
| | | | 385/101 |
| 2015/0266436 | A1* | 9/2015 | Erb ........................ B60Q 1/00 |
| | | | 340/870.28 |
| 2015/0285993 | A1* | 10/2015 | Hokansson ........ G02B 6/02395 |
| | | | 65/529 |
| 2015/0344061 | A1* | 12/2015 | Uematsu ................. H05B 3/18 |
| | | | 219/204 |
| 2015/0367875 | A1* | 12/2015 | Nonoyama ............ B62D 1/065 |
| | | | 219/204 |
| 2016/0101805 | A1* | 4/2016 | Nishio ..................... H05B 6/02 |
| | | | 219/204 |
| 2016/0354601 | A1* | 12/2016 | Walsh .................... A61N 1/057 |
| 2017/0183025 | A1* | 6/2017 | Okazaki .................. B62D 1/06 |
| 2017/0192451 | A1 | 7/2017 | Choi et al. |
| 2017/0282955 | A1* | 10/2017 | Morita ............... B29C 45/1671 |
| 2017/0334477 | A1 | 11/2017 | Dossier et al. |
| 2018/0287191 | A1* | 10/2018 | Uhm ....................... H01M 4/13 |
| 2018/0354543 | A1* | 12/2018 | Nishio .................. B62D 1/065 |
| 2019/0241204 | A1* | 8/2019 | Uematsu ............... B62D 1/065 |
| 2019/0277713 | A1* | 9/2019 | Moriura .................... G01L 1/14 |
| 2020/0239060 | A1* | 7/2020 | Hyoudou ............... B62D 1/065 |
| 2020/0388740 | A1* | 12/2020 | Toyoshima ............ H01L 35/30 |
| 2021/0028784 | A1* | 1/2021 | Takahara ............... B62D 1/046 |

FOREIGN PATENT DOCUMENTS

| | | | |
|---|---|---|---|
| DE | 19734420 | A1 | 2/1999 |
| DE | 10058754 | A1 | 6/2001 |
| DE | 10149122 | A1 | 6/2002 |
| DE | 102006061263 | A1 | 6/2008 |
| DE | 102014016422 | A1 | 5/2016 |
| DE | 102015214889 | A1 | 2/2017 |
| EP | 0832806 | A1 | 4/1998 |
| EP | 1293992 | A2 | 3/2003 |
| WO | WO2004022409 | A2 | 3/2004 |
| WO | WO-2006069746 | A1 * | 7/2006 ............. B62D 1/046 |

OTHER PUBLICATIONS

Machine Translation of WO 2006/069746, obtained Dec. 17, 2021.*
"Single-Mode Optical Fiber," Wikipedia Page, dated by Wayback Machine to Jul. 4, 2017, url:<https://web.archive.org/web/20170704120549/https://en.wikipedia.org/wiki/Single-mode_optical_fiber>.*

* cited by examiner

HEATABLE TOUCH SENSOR AND STEERING WHEEL HAVING SUCH A TOUCH SENSOR

This nonprovisional application claims priority under 35 U.S.C. § 119(a) to German Patent Application Nos. 10 2018 113 062.7 and 10 2018 113 061.9, which were both filed in Germany on May 31, 2018, and which are herein incorporated by reference

BACKGROUND OF THE INVENTION

Field of the Invention

The present invention relates to a heatable touch sensor, in particular for use on a steering wheel of a vehicle. Touch sensing of the steering wheel and steering wheel heating can be realized by the heatable touch sensor.

Description of the Background Art

A device for detecting steering wheel contact is presented in DE 10 2014 016 422 A1, which corresponds to US 2017/0334477, in which a first electrode is disposed in a steering wheel and the human body represents the second electrode upon contact and a dielectric is situated between these two electrodes. A disadvantage of this solution is an imprecise detection of the steering wheel contact, as this is also triggered by a knee or a bottle. In addition, contact with gloves is often not detected based on the capacitive principle.

A steering wheel with an integrated steering wheel heater is presented in EP 0 832 806 A1, in which the steering wheel rim has, under its outer covering, a layer of thermoplastic material in which a heating wire is located.

The aforementioned possibilities for detecting steering wheel contact and for heating a steering wheel rim, in addition to the already mentioned disadvantages, can be integrated into a steering wheel only with high assembly effort, which is associated with high costs. In addition to the large number of parts to be installed, the reason for this is that the capacitive sensing principle requires electromagnetic shielding from the heating elements for faultless detection.

Not least, the capacitive sensing comprises a planar component and the steering wheel heater must be placed under it, which is disadvantageously associated with high heat losses.

SUMMARY OF THE INVENTION

It is therefore an object of the present invention to provide a combination of a touch sensor and a heater, which enables very accurate detection, can be produced inexpensively, and can be integrated with little assembly effort into a steering wheel.

The heatable touch sensor of the invention can be a fiber-optic touch sensor and can have an optical waveguide which is connected to an electrical heat conductor. The optical waveguide changes its transmission behavior, to be measured, with a change in position or bending. In operation, the optical waveguide is exposed to light at one end, for example, by means of a photodiode and at the other end changes in the transmitted light are detected by means of a suitable sensor system. The optical waveguide in this case can be formed of glass fibers or plastic fibers.

The heat conductor can be a resistance heater, which converts electrical energy into heat by applying an electrical voltage and by the associated current flow and gives it off to the surroundings.

Advantageously, touch sensing and a heating function can be realized by incorporating a component, for example, into a steering wheel. Further advantageously, the use of a fiber-optic touch sensor enables a high detection accuracy, which prevents false triggering or "fooling" of the detection, for example, by a knee or a bottle on the steering wheel, and functions unchanged with gloves as well. In addition, the fiber-optic touch sensor has a shorter response time than the capacitive sensors of the prior art.

The electrical heat conductor can be an electrically conductive coating applied to the fiber-optic touch sensor. This coating can be, for example, a copper layer but other materials such as aluminum, chromium, or nickel can also be used. A variety of materials for heat conductors are known in the prior art. Advantageously, the heat conductor has such a very homogeneous heat output.

Further preferably, an insulating varnish or a sheath made of an electrically non-conductive material, for example, a plastic sheath, for example, made of polyimide, silicone, Teflon PEEK, PEK, PP, PA, PE, etc., is provided on the electrically conductive coating. Advantageously, an electrical short circuit of the heat conductor, for example, by a change in position in the steering wheel due to material fatigue due to aging can thus be prevented.

A layer of carbon can be disposed between the electrically conductive sheath and the fiber-optic touch sensor. Advantageously, the carbon layer stabilizes the fiber-optic touch sensor.

The optical waveguide can have a single mode fiber. A single mode fiber is advantageously particularly well suited for touch sensing and enables very accurate detection. The single mode fiber in this regard can have different core diameters; for example, 4 µm, 6 µm, 8 µm, 9 µm, and 10 µm, etc., can be used.

The fiber-optic touch sensor can be implemented by means of optical interferometry. This measuring principle works particularly well in conjunction with a single mode fiber and advantageously enables a very high resolution and thus very accurate detection.

The heatable touch sensor can be disposed on a carrier film. In this case, the heatable touch sensor is preferably fixed on the carrier film such that its surface is covered. For example, to this end the heatable touch sensor can be arranged in a meandering or helical manner on the carrier film. The fixation on the carrier film is preferably carried out by gluing. It is understood that in the event that the heat conductor has no insulation layer on the outside, the carrier film need not be electrically conductive or itself must have an insulating layer to prevent an electrical short circuit of the heat conductor. Advantageously, the assembly at the intended site is significantly simplified by the arrangement of the touch sensor on a carrier film. For example, in the case of installation in a steering wheel, the integration requires only one additional step, namely the lamination of the carrier film to the inside of the steering wheel cover.

The carrier film has a good thermal conductivity. Advantageously, the effect of the heat conductor can be homogenized over the surface of the carrier film, so that a homogeneous temperature field and a good response of the steering wheel heating are achieved on the outer surface of the steering wheel. In the case of installation in a steering wheel, it is preferably provided that the carrier film with good thermal conductivity is laminated to the inside of the steering wheel cover. Cover here refers to the outer skin of the steering wheel. Preferred materials for the carrier film are copper or aluminum, which have good thermal conductivity and are available at low cost.

The fiber-optic touch sensor can be disposed between two carrier films, wherein one carrier film has a good thermal conductivity and the other film has heat-insulating properties. In the case of installation in a steering wheel, the film with the heat-insulating property is directed towards the center of the steering wheel rim. As a result, the heat emission into the interior of the steering wheel rim can advantageously be reduced and thus a large part of the introduced heat energy can be directed, perceptible for the user, to the surface of the steering wheel rim.

Further, the fiber-optic touch sensor can be embedded with the heat conductor in a matrix material. This is preferably a foamable material, for example, a polyurethane (PUR). Advantageously, the position of the fiber-optic touch sensor is thus well fixed, and if the matrix is not electrically conductive, fiber-optic touch sensors without the insulating varnish or plastic sheathing described above can also be used.

The touch sensor of the invention comprising at least one optical waveguide and at least one electrical conductor according to an embodiment is characterized in that the at least one electrical conductor is wound around the at least one optical waveguide or is wound together with the at least one optical waveguide.

The fact that the electrical conductor is wound around the optical waveguide means that the optical waveguide is straight and the electrical conductor is wound around the optical waveguide. Wound together here can mean that neither optical waveguides nor electrical conductors are made straight but are entangled with one another.

The invention advantageously makes it possible to also use plastic fibers as materials for the optical waveguide, because the melting point of the material plays no role in production. It is further advantageous that the production is much less expensive than in the prior art.

The optical waveguide within the context of this application can be formed of a single fiber or of a fiber bundle.

The electrical conductor can also be a single conductor or a stranded wire. One or more electrical conductors can be provided; in the case of multiple electrical conductors, these can also be made of different materials.

The optical waveguide can have a sheath. The sheath can be made of different materials, for example, plastic or carbon as well. Advantageously, the sheath improves the total reflection in the outer region of the optical waveguide as well as the mechanical properties of the optical waveguide; for example, the risk of bending the optical waveguide can be significantly reduced.

The electrical conductor can have a coating with an insulating varnish. Advantageously, a short circuit with the conductor itself or others can thus be prevented, whereby a plurality of mutually independent electrical conductors can also be integrated. For example, an electrical conductor for data transmission and a further electrical conductor can thus be used as a heat conductor in a conductor bundle. For example, polyurethane, polyester imide, or a mixture of polyester imide and polyamide-imide are provided as insulating varnishes.

The optical waveguide can be straight and the electrical conductor can be wound around the optical waveguide. Advantageously, the limited flexibility of the optical waveguide in conjunction with the significantly better flexibility of the metallic electrical conductor are thus taken into account.

Further preferably, the winding of the optical waveguide with the electrical conductor has a variable lay length. Advantageously, the heat output in different areas can thus be precisely adjusted when the electrical conductor is used as a heat conductor. In an alternative embodiment, regions of different lay lengths can also alternate.

The optical waveguide can be made of glass fiber, polycarbonate (PC), polymethyl methacrylate (PMMA), or elastomers. The cross-sectional shape of the optical waveguide in this regard can be, for example, round, rectangular, triangular, rectangular with a central bore, or hexagonal.

The electrical conductor preferably can be formed of copper, aluminum, copper-clad aluminum, brass, silver, gold, nickel, constantan, stainless steel, or other conductive materials.

The touch sensor of the invention comprising an optical waveguide and an electrical conductor can be disposed on a carrier film. Depending on the application, the conductor bundle can be disposed flat, for example, in a meandering manner, on the film. Thus, advantageously, when a heat conductor is used as the electrical conductor, a planar heat output can be achieved. This effect can be further advantageously supported by a high thermal conductivity of the carrier film.

A steering wheel of a vehicle, in particular of a motor vehicle, comprises a steering wheel hub, which is disposed in the axis of rotation of the steering wheel. The outer area of the steering wheel that the user normally touches is called the steering wheel rim. The steering wheel rim is usually circular, but may also have flattened areas or discontinuities. The steering wheel rim and hub link the steering wheel spokes, which also vary in number and size.

The steering wheel of the invention has at least one heatable touch sensor of the invention.

In order to enable a precise detection of steering wheel contact, a plurality of fiber-optic touch sensors are preferably disposed in a steering wheel. Advantageously, it is thus possible to determine whether one or both hands are on the steering wheel, whether the hand is only placed on or grips around the steering wheel rim, and so on.

The heatable touch sensor can be used not only on the steering wheel rim, but also on the steering wheel spokes and/or optionally also in the region of the steering wheel hub. This depends in particular on the specific steering wheel design. The aim is to be able to determine as much as possible every touch on the steering wheel.

For this purpose, the steering wheel is divided into circle segments in a preferred embodiment. Depending on the desired accuracy and the design of the specific steering wheel (for example, size and location of the steering wheel spokes), a number of circle segments can be selected here. For example, the steering wheel can be divided into four equal-sized circle segments or into three or two segments as well. Frequently, the number of existing steering wheel spokes provides a basis for this. The separation of the segments should be such that it is unlikely that both hands will engage in one circle segment.

The division into circle segments advantageously makes it possible in particular to determine whether one or two hands touch the steering wheel.

Further preferably, the circumference of the steering wheel rim can be divided into zones. For explanation purposes, areas are given below by way of example: the surface facing the driver, the surface facing away from the driver, the surface facing the steering wheel hub, and the surface facing away from the steering wheel hub. The division of the circumference of the steering wheel rim advantageously makes it possible to determine whether the wheel rim is gripped by a hand or the hand is only placed on it.

Detection areas are defined by division into circle segments and zones; these advantageously enable a precise determination of the position of the hands on the steering wheel. A sensor element is integrated for this purpose in each of these detection areas. A sensor element is a planar element having a heatable touch sensor of the invention. The sensor element can be adapted in size and shape to the specific installation location. Depending on the design of the particular steering wheel, additional detection areas in the area of the steering wheel spokes or the steering wheel hub as well can be useful.

The signals of the sensor elements are evaluated by an evaluation algorithm by means of a control unit. In potentially dangerous hand positions on the steering wheel or lack of contact, the system can then issue a visual or audible warning. Further preferred embodiments of the invention emerge from other features recited in the dependent claims.

The various embodiments of the invention mentioned in this application can be advantageously combined with one another.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
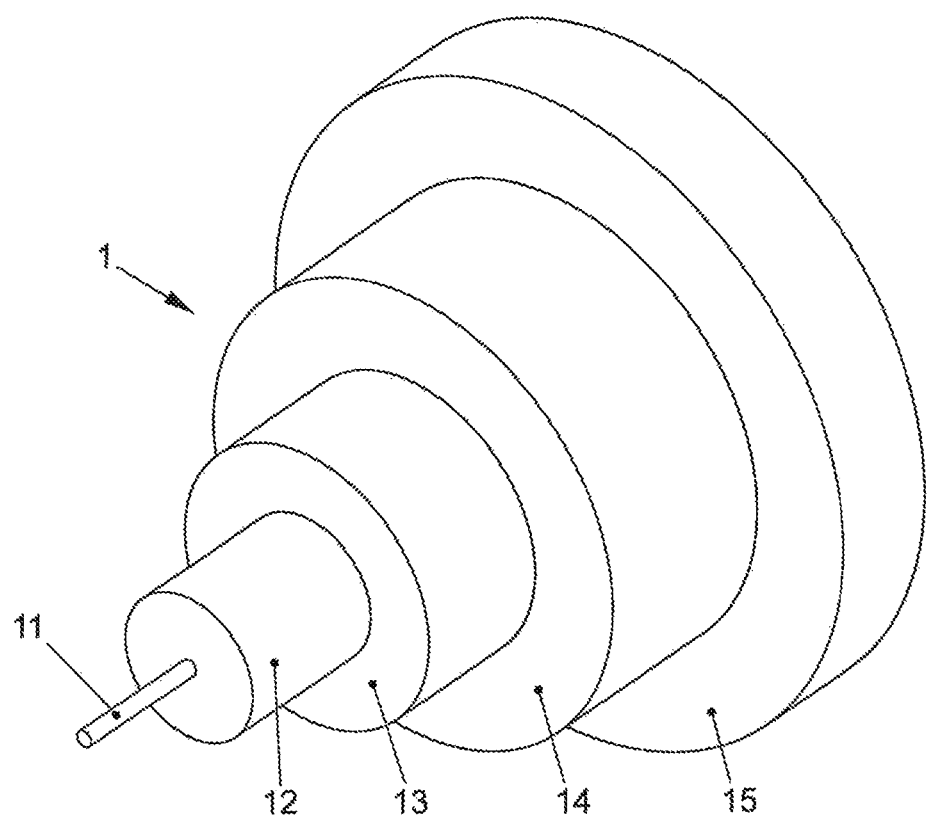
FIG. 1 shows the structure of a heatable, fiber-optic touch sensor of the invention.

FIG. 1 shows the structure of a heatable, fiber-optic touch sensor 1 of the invention. It has an optical waveguide 11 in the core, in the form of a single mode fiber with a diameter of 4 to 10 µm. The single mode fiber is enclosed by a sheath 12 having a diameter of 50 to 125 µm.

A carbon layer 13 is disposed on core sheath 12. A heat conductor 14, in this exemplary embodiment in the form of a copper layer with a diameter of 165 µm, is disposed on carbon layer 13. An insulating varnish 15 is applied as the outermost layer.

Figure 2:
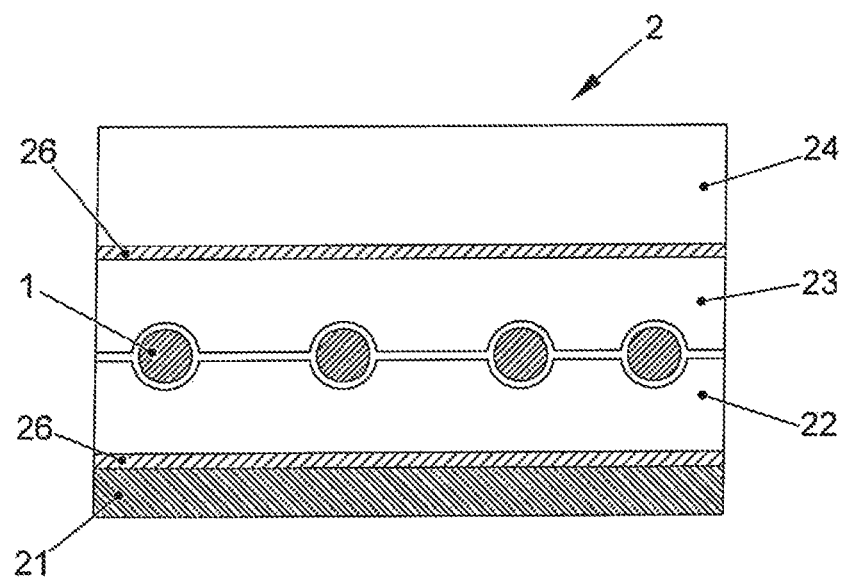
FIG. 2 shows a variant of the integration of a heatable, fiber-optic touch sensor into a steering wheel.

FIG. 2 shows a sectional view of a steering wheel rim 2. Steering wheel rim 2 has a cover 21, made of leather, on the outside. The inside of cover 21 is connected by means of a thermally activatable lamination 26 to a thermally conductive film 22 made of aluminum, copper, or another good thermally conductive material. Thermally conductive film 22 is connected to a heat-insulating film 23, wherein heatable touch sensor 1 of the invention is embedded between thermally conductive film 22 and heat-insulating film 23. The embedding occurs in a meandering manner between the two films 22 and 23, so as to enable planar touch sensing and heating.

Heat-insulating film 23 is glued to steering wheel rim support structure 24 made of, for example, PUR material or other thermoplastic materials and adhesives. A homogeneous heat distribution on the contact surface with low heat losses is ensured by embedding the heatable, fiber-optic touch sensor 1 in a thermally conductive film 22, which is directed to the outside of steering wheel rim 2 (contact surface), and a heat-insulating film 23, which is directed to the support structure of steering wheel rim 2.

Figure 3:
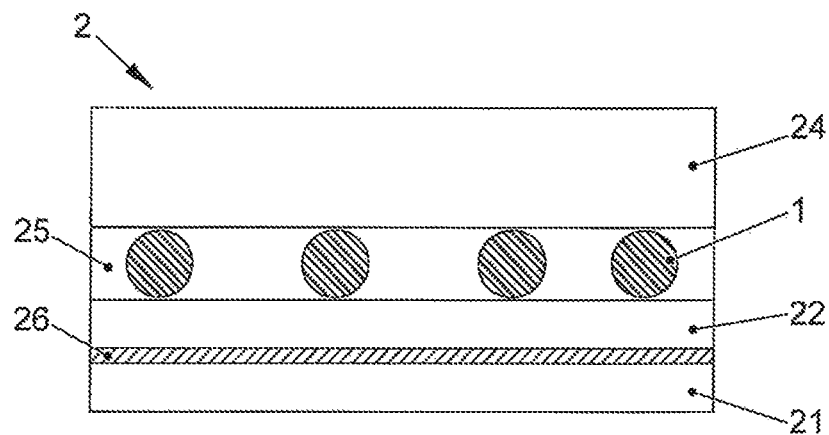
FIG. 3 shows an alternative variant of the integration of a heatable, fiber-optic touch sensor into a steering wheel.

FIG. 3 likewise shows a sectional view of a steering wheel rim 2 with an alternative integration of the heatable, fiber-optic touch sensor 1 of the invention. It is introduced here into a foamable, adhesive matrix 25, which is also made of PUR. Matrix 25 is glued to the steering wheel rim support structure 24. Directed to the outside of steering wheel rim 2, matrix 25 is glued to a thermally conductive film 22. Thermally conductive film 22 is again connected by means of a thermally activatable lamination 26 to the inside of cover 21 of steering wheel rim 2. Here as well, heatable touch sensor 1 is introduced in a meandering manner into matrix 25, so as to enable planar touch sensing and heating.

The integration of touch sensing and heating in a steering wheel, very simple in terms of manufacturing technology, is readily recognizable, because an additional layer in the form of heatable touch sensor 1, placed between two films 22 and 23, needs to be introduced under cover 21 merely by means of lamination 26.

Figure 4:
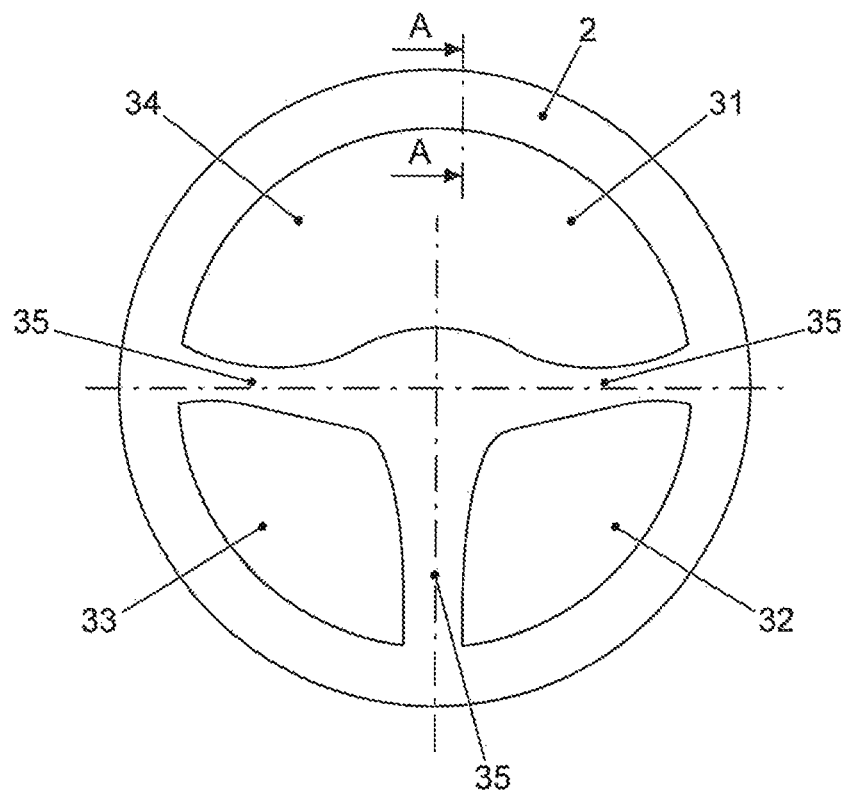
FIG. 4 shows a division of a steering wheel into circle segments as detection zones.

FIG. 4 shows the division of a steering wheel 3, having a steering wheel rim 2 and steering wheel spokes 35, into circle segments for defining detection zones of the steering wheel contact. Steering wheel 3 was divided into four circle segments 31, 32, 33, and 34 on the basis of steering wheel spokes 35.

Figure 5:
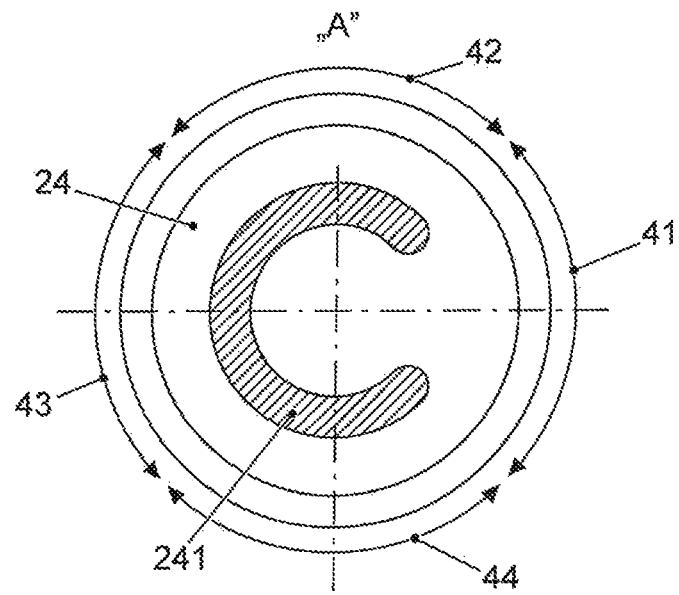
FIG. 5 shows the representation of the cross section of a steering wheel rim with detection zones.

FIG. 5 shows the cross section of circle segment 31 in the sectional plane A of steering wheel rim 2, shown in FIG. 4, with support structure 24 and metallic support 241. Four detection zones 41, 42, 43, and 44 were also defined over the circumference of steering wheel rim 2. Detection zone 41 faces the driver; detection zone 42 designates the area directed towards the steering wheel center (steering wheel hub), detection zone 43 designates the area facing away from the driver (therefore toward the instrument panel), and detection zone 44 designates the area facing away from the center of the steering wheel (thus facing away from the steering wheel hub).

Four sensor elements distributed over the four zones 41, 42, 43, and 44 are arranged in each of the four segments 31, 32, 33, and 34. As a result of this distribution of the sensor elements, it is possible to determine firstly whether the driver has one or two hands on steering wheel rim 2 and in which circle segment 31, 32, 33, or 34 they are located. In addition, it can be determined whether the driver places his hands only on steering wheel rim 2, for example, by detection only in zone 41, or grips the entire steering wheel rim 2 with the hand, by detection in all four detection zones.

Figure 6:
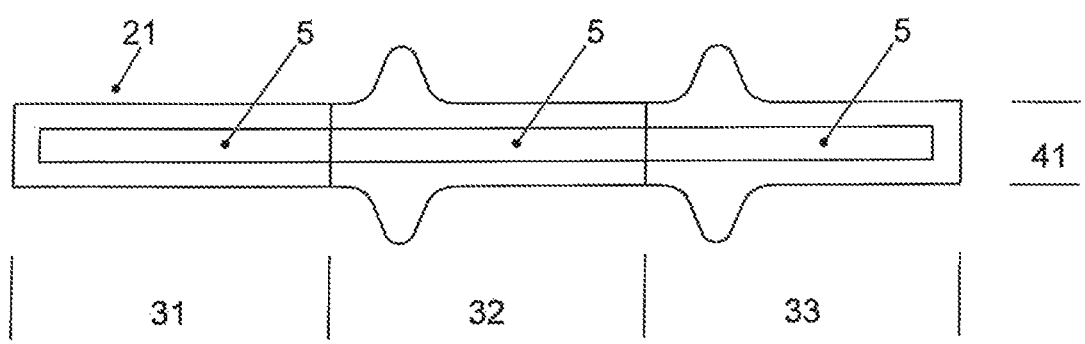
FIG. 6 shows a segmented steering wheel cover with heatable, fiber-optic touch sensors of the invention.

FIG. 6 shows an element of a cover 21 of a steering wheel rim 2, on the inside of which there are sensor elements 5, formed of thermally conductive film 22, heat-insulating film 23, and heatable, fiber-optic touch sensor 1 arranged therebetween and covering the surface in a meandering manner (see FIG. 2). The element shown of cover 21 covers detection zone 41 of steering wheel rim 2 over segments 31, 32, and 33 and has a sensor element 5 for each segment 31, 32, 33. Thus, a segmented touch sensing of detection zone 41 is made possible with little assembly effort. The element of cover 21 is then glued to further cover elements 21 in order to cover the entire steering wheel rim 2.

Figure 7:
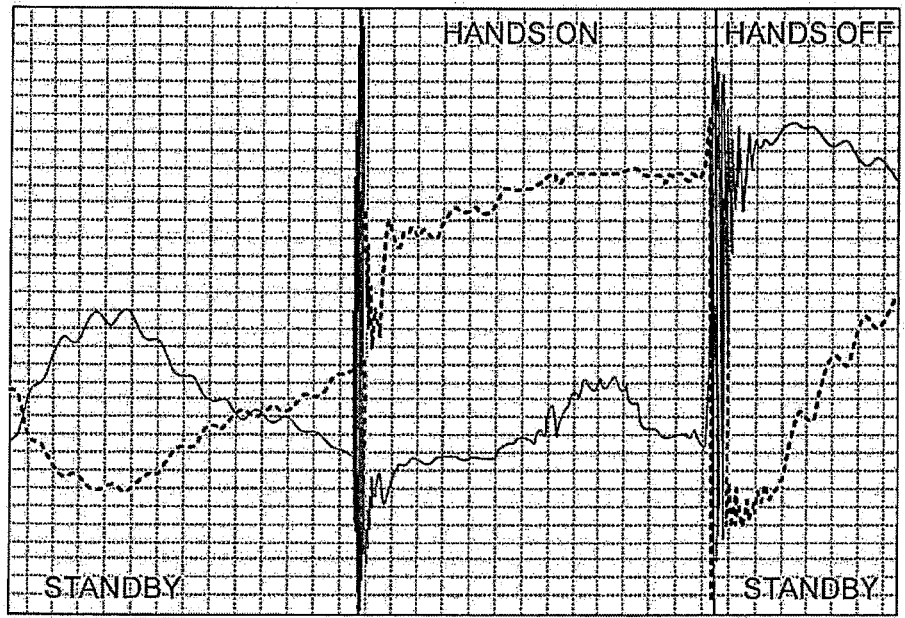
FIG. 7 is a diagram of the results of touch sensing with turned-off heating.

FIG. 7 shows the diagram of the touch sensing with the heating turned off. Two interference raw signals PD1 (solid line) and PD2 (broken line) can be seen. In the left part of the diagram, the system is in standby; that is, there is no contact. At about 4 s, there is contact of the steering wheel (hands on), which is detected by a brief noise of both signals. After that, the system is in a quasistatic state. At about 6 s, the steering wheel is released again (hands off), which is also recognizable by a noise of both signals. After that, the system is again in standby. A different signal behavior during hands on compared to hands off is also clearly evident.

Figure 8:
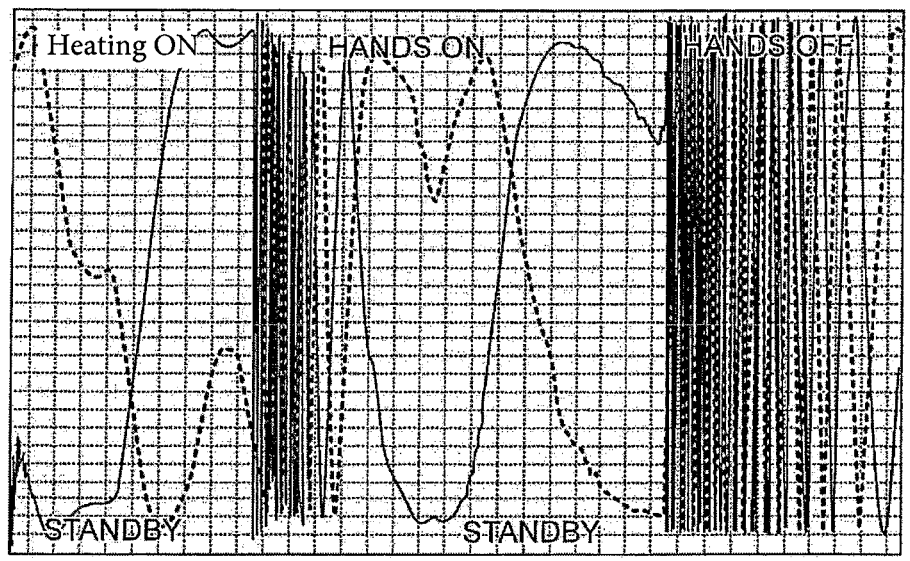
FIG. 8 is a diagram of the results of the contact sensing with turned-on heating.

FIG. 8 shows the diagram from FIG. 7 with the heating turned on. Here as well, the events of hands on at about 2.7 s and hands off at about 7.3 s are easily recognizable by the noise. Thus, the touch sensing is independent of the heating function.

Hereinafter, further embodiment variants will be explained with reference to FIGS. 9 and 10, in which the heat conductor as an electrical conductor (wire) and an optical waveguide are wound.

Figure 9:
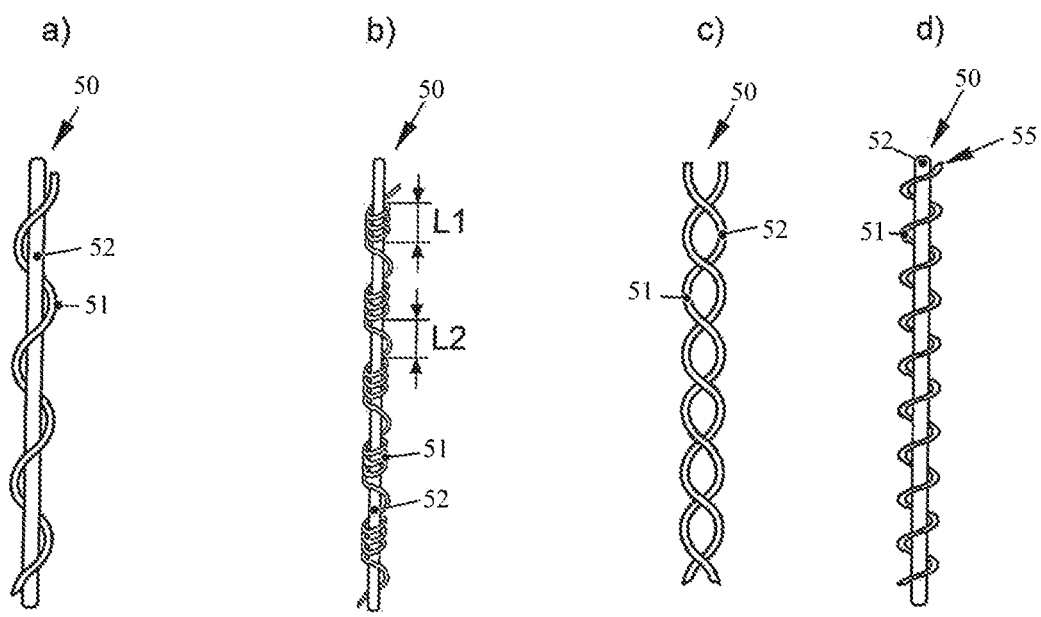
FIGS. 9 and 10 show further embodiment variants of a touch sensor.

FIG. 9 shows different variants a) to d) of a conductor bundle 50. In variant a), an electrical conductor 51 is wound around a straight optical waveguide 52 with a constant lay length.

In variant b), electrical conductor 51 is also wound around a straight optical waveguide 52, but with two different lay lengths. Regions 53 with a short lay length L1 alternate with regions 54 with a longer lay length L2.

Variant c) shows a conductor bundle 50 in which optical waveguide 52 is wound together with the electrical conductor 51, wherein optical waveguide 52 is not made straight here.

Variant d) shows a straight optical waveguide 52, which is wound with two different electrical conductors 51 and 55 with a constant lay length.

Figure 10:
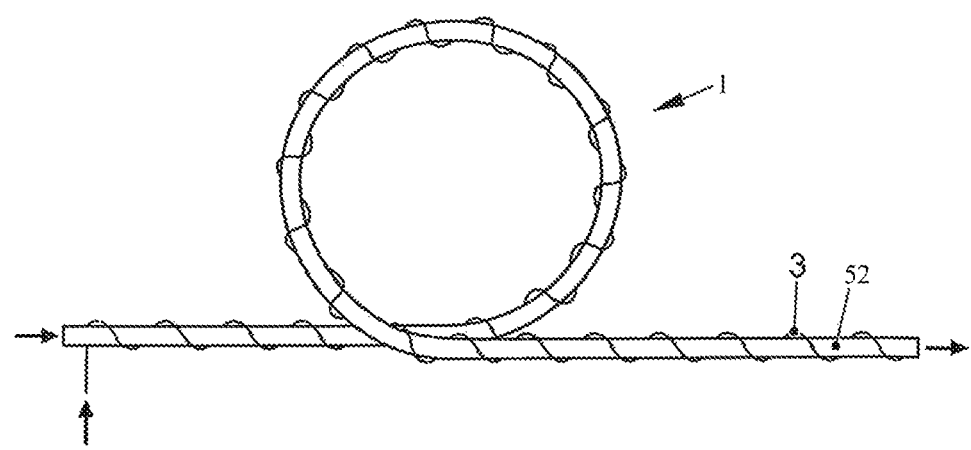

FIG. 10 shows a heatable touch sensor 1 for installation in a steering wheel under the steering wheel cover. Here, optical waveguide 52 is a touch sensor which detects changes in position or bending and thus touches by the user by means of interferometry through the steering wheel cover. An electrical conductor 51, which acts as a resistance heater, is wound around optical waveguide 52. For installation in the steering wheel, the heatable touch sensor is applied in a meandering manner to a carrier film, to enable planar sensing and heating. The carrier film is made of aluminum and thus has a very good thermal conductivity, so that the steering wheel heating responds quickly. It is understood that electrical conductor 51 is provided with an insulating varnish to prevent an electrical short circuit.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A steering wheel comprising:
    a metallic core;
    a support structure, made of thermoplastic material, contacting an exterior surface of the metallic core and disposed around the metallic core;
    a heat insulating foam matrix disposed around the support structure;
    a thermally conductive film disposed around the heat insulating foam matrix;
    a cover disposed around the thermally conductive film;
    a heatable touch sensor embedded within the heat insulating foam matrix, and substantially having a thickness extending from the support structure to the thermally conductive film, the heatable touch sensor comprising:
        an optical waveguide;
        an electrical heat conductor disposed around the optical waveguide;
    wherein touch sensing by the heatable touch sensor is carried out via optical interferometry.

2. The steering wheel according to claim 1, wherein the heatable touch sensor further comprises a carbon layer disposed between the optical waveguide and the electrical heat conductor.

3. The steering wheel according to claim 2, wherein the heatable touch sensor further comprises an insulating varnish coated directly on the electrical heat conductor, the insulating varnish comprising polyamide, silicone, polytetrafluoroethylene, polyether ether ketone, polyether ketone, polypropylene, or polyethylene.

4. The steering wheel according to claim 2, wherein the heatable touch sensor further comprises a plastic sheath disposed between the optical waveguide and the carbon layer.

5. The steering wheel according to claim 1, wherein the optical waveguide is a single mode fiber.

6. The steering wheel according to claim 1, wherein the electrical heat conductor is spirally wound around the optical waveguide.

7. The steering wheel according to claim 6, wherein the electrical heat conductor is spirally wound around the optical waveguide with different lay lengths.

8. The steering wheel according to claim 1, wherein the steering wheel is divided into circle segments, each circle segment having at least one heatable touch sensor.

9. The steering wheel according to claim 8, wherein a plurality of detection zones are defined for each circle segment over a cross section of the steering wheel rim, each detection zone having at least one heatable touch sensor.

10. The steering wheel according to claim 8, wherein at least one heatable touch sensor is disposed in a region of spokes of the steering wheel.

11. The steering wheel according to claim 1, wherein the heatable touch sensor is arranged in a meandering manner, so that the heatable touch sensor has a planar extent.

12. The steering wheel according to claim 1, wherein the steering wheel is a steering wheel of a motor vehicle.

13. The steering wheel according to claim 1, further comprising a thermally activatable lamination layer connecting the cover to the thermally conductive film.

\* \* \* \* \*